United States Patent

Fujiwara et al.

[11] Patent Number: 5,199,739
[45] Date of Patent: Apr. 6, 1993

[54] AIR BAG COVER OPENING MECHANISM FOR USE IN VEHICLE

[75] Inventors: Kazuyuki Fujiwara, Okazaki; Shotaro Okamura; Hiroaki Yamao, both of Toyota, all of Japan

[73] Assignee: Toyota Jidosha Kabushiki Kaisha, Toyota, Japan

[21] Appl. No.: 744,447

[22] Filed: Aug. 13, 1991

[30] Foreign Application Priority Data

Sep. 5, 1990 [JP] Japan .................. 2-236510

[51] Int. Cl.$^5$ ............................ B60R 21/16
[52] U.S. Cl. ...................... 280/732; 280/743
[58] Field of Search ............ 280/728, 731, 732, 743

[56] References Cited

U.S. PATENT DOCUMENTS 4,842,299 6/1989 Okamura et al. ............ 280/732
5,060,972 10/1991 Satoh et al. ................. 280/732

FOREIGN PATENT DOCUMENTS 63-100352 6/1988 Japan .
63-111353 7/1988 Japan .
1-123961 8/1989 Japan .

Primary Examiner—Kenneth R. Rice
Attorney, Agent, or Firm—Cushman, Darby & Cushman

[57] ABSTRACT

An air bag cover opening mechanism for an air bag for use in a vehicle. An air bag cover for closing an opening provided in an air bag case with an air bag accommodated therein has at one end thereof a hinge formed integrally with an inner surface layer of the air bag cover. A slit is provided in the inner surface layer of the air bag cover at the other end thereof to allow one end of a retainer to be retained therein. The other end portion of the retainer has a hole. With this hole aligned with a hole provided in a side wall of the air bag case, a spacer is inserted into the aligned holes, and a bolt is threadedly inserted into an internally threaded hole provided in the spacer and is tightened, thereby allowing the retainer to be rotatably held onto the air bag case and the other end of the air bag cover to be fixed. At the time of inflation of the air bag, the retainer rotates such that only a tensile load oriented in the same direction as the direction of a load applied to the air bag cover acts on the retainer, allowing a breaking portion of the retainer to be broken.

18 Claims, 6 Drawing Sheets

AIR BAG COVER OPENING MECHANISM FOR USE IN VEHICLE

BACKGROUND OF THE INVENTION

1. Field of the Invention

The present invention relates to an air bag cover opening mechanism for use in a vehicle. Description of the Related Art:

A technique concerning a structure for fixing an air bag cover for a passenger seat air bag is disclosed in Japanese Utility Model Application Laid-Open No. 63-111353.

Figure 6:
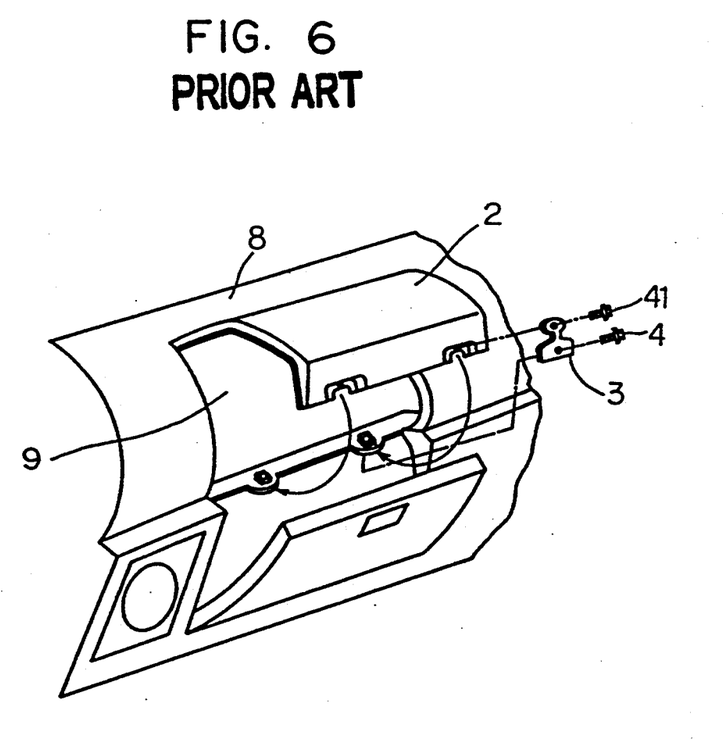
FIG. 6 is an overall perspective view of a conventional air bag cover opening mechanism.

This technique is shown in FIG. 6. The prior art discloses, as shown in FIG. 6, an opening 9 for allowing an unillustrated air bag to jump out therethrough which is provided at a predetermined location in an instrument panel 8 corresponding to a passenger seat. The opening 9 is closed by an air bag cover 2. The air bag cover 2 has an upper end secured rotatably to the instrument panel 8 via a hinge or the like, and a lower end secured to the instrument panel 8 by means of resin-made retainers 3 and bolts 4, 41.

A detailed description will now be given of a specific prior art structure for securing the lower end of the air bag cover 2.

Figure 7:
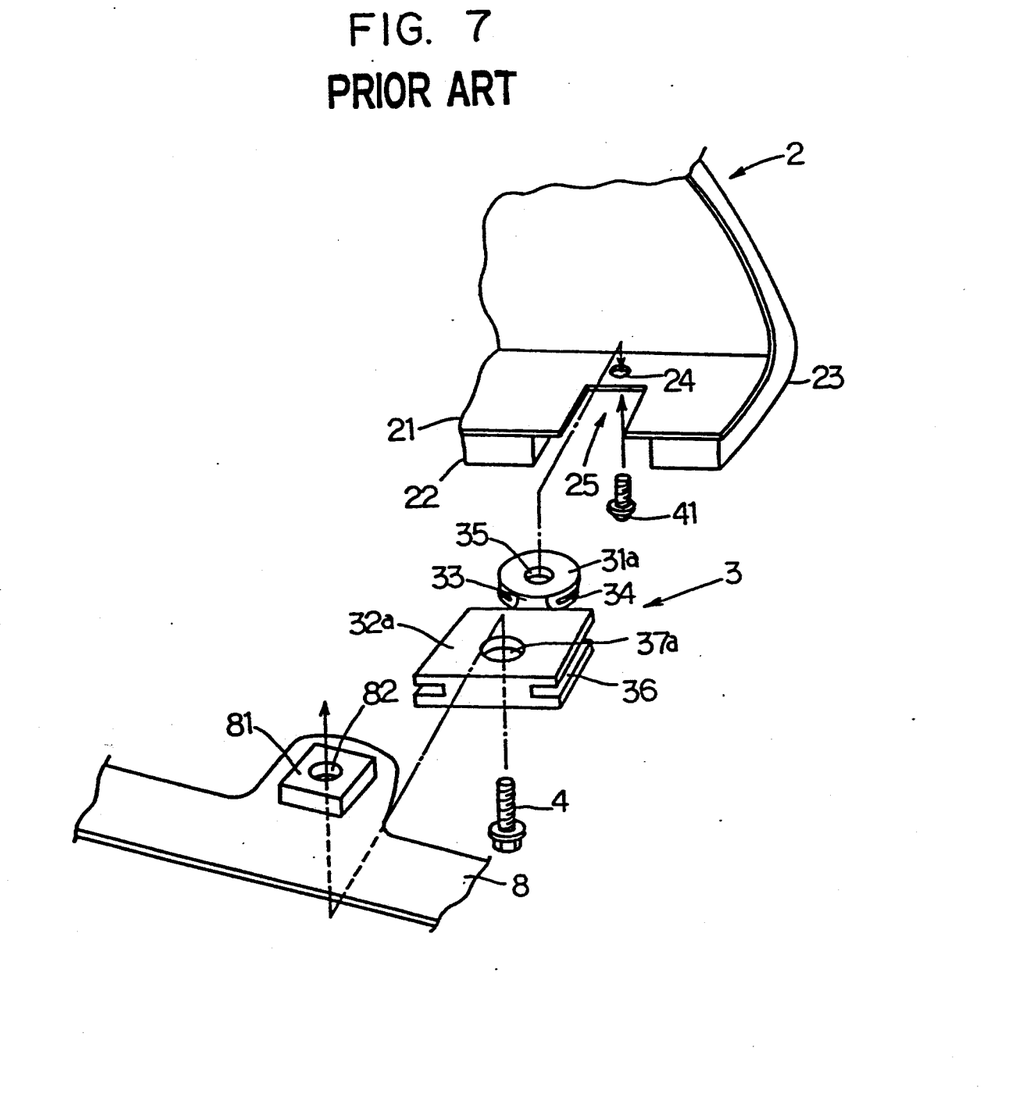
FIG. 7 is an enlarged exploded perspective view illustrating how the other end of the conventional air bag cover is fixed by means of a retainer.

As shown in FIG. 7, the air bag cover 2 has a three-layered structure comprising a metal insert 21, a foamed layer 22, and a surface layer 23. A notched portion 25 to which the retainers 3 is attached is not provided in the foamed layer 22 or the surface layer 23 but is provided only in the insert 21, and a threaded hole 24 is also provided therein.

Figure 8:
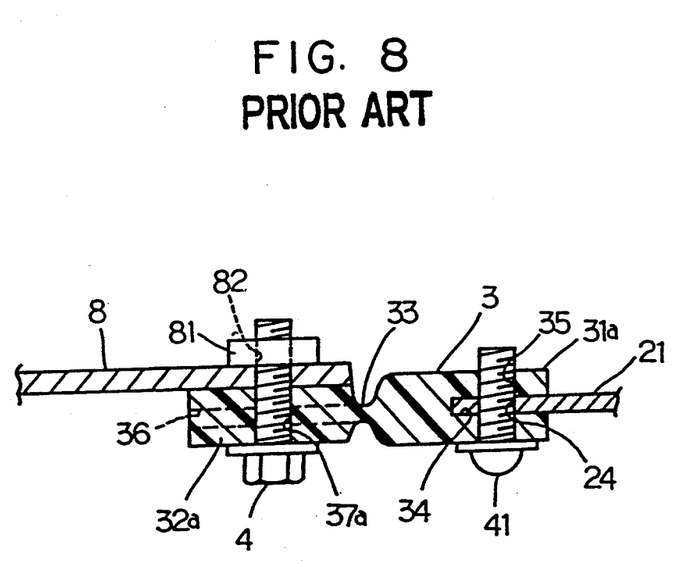
FIG. 8 is a cross-sectional view of the conventional retainer and its surrounding portions.

The retainer 3 is arranged such that two retaining portions 31a, 32a are connected to each other via a thin integral hinge 33, as shown in FIG. 8.

One retaining portion 31a is provided with a slot 34 extending longitudinally from a thicknesswise central portion of one end thereof. Also, a hole 35 is provided in a central portion of the retaining portion 31a in such a manner as to penetrate the two slotted segments thereof. Grooves 36 are respectively formed longitudinally in opposite sides of the other retaining portion 32a, and a hole 37a is provided in a central portion thereof in such a manner as to penetrate the same in the same direction as the hole 35.

As shown in FIG. 8, the retainer 3 is fitted to the notched portion 25 in such a manner that the slot 34 of the retaining portion 31a is received by the innermost portion of the insert 21, while the grooves 36 of the other retainer 32a are received by inner lateral portions of the insert 21 at the notched portion 25. Thus the overall retainer 3 is accommodated in the notched portion 25. Then, one retaining portion 31a is secured to the air bag cover 2 as the screw 41 is inserted into the holes 35, 24 and tightened. Meanwhile, the other retaining portion 32a is superposed on a fixing portion 81 of the instrument panel 8, and is secured to the instrument panel 8 by a bolt 4 inserted into the hole 37a provided in the other retaining portion 32a. As a result, the air bag cover 2 is secured to the instrument panel 8.

With the above-described structure for fixing the air bag cover, since the retainer 3 is closely secured to the air bag cover, even if vibrations are applied to the instrument panel 8 during normal running of the vehicle, the integral hinge 33 does not undergo fatigue. At the time of inflation of the air bag, however, the air bag cover 2 is pressed by a load caused by the inflation of the air bag, with the result that the integral hinge 33 is broken, thereby allowing the air bag cover 2 to be pushed open.

However, with the above-described conventional structure for fixing the air bag cover 2, since the other retaining portion 32a secured to the instrument panel 8 side of the retainer 3 is constantly located at the same position relative to the movement of the air bag cover 2 which is pushed open toward the interior of the vehicle compartment, both a load oriented in the pulling direction and a load oriented in the shearing direction act on the integral hinge 33 which is the breaking portion. Accordingly, the load occurring at the time of the inflation of the air bag is not effectively transmitted to the integral hinge 33 which is the breaking portion of the retainer 3, with the result that there is the possibility that the air bag cover 2 may not be pushed open smoothly.

SUMMARY OF THE INVENTION

In view of the above-described circumstances, it is an object of the present invention to provide an air bag cover opening mechanism for smoothly pushing open an air bag cover. The present invention utilizes the load occurring at the time of the inflation of the air bag by converting a load acting on a retainer in a shearing direction to a load acting in a pulling direction.

The air bag cover opening mechanism in accordance with the present invention is used for opening an air bag device. The mechanism comprises air bag case secured to a vehicle body for accommodating an air bar in a folded state. The air bag has an opening in the inflating direction of the air bag. An air bag cover covers the opening provided in the air bag case. One end of the air bag cover is hingably connected to the air bag case via a connecting member. The other end of the air bag cover is secured to the air bag case or the vehicle body via a retainer which is secured rotatably by means of connecting members such that only tensile force acting in the same direction as the direction of the pushing open of the air bag cover is applied thereto.

In accordance with the present invention arranged as described above, at the time of inflation of the air bag, the air bag cover tends to be pushed open with the connecting member securing one end of the air bag cover as a center of rotation, while the air bag is being inflated toward the interior of a vehicle compartment. This movement causes a load oriented in the pulling direction and a load oriented in the shearing direction to be applied to the retainer. However, since the retainer is attached to the air bag case in such a manner as to be rotatable in the same direction as the opening direction of the air bag cover, the retainer, upon application of the load oriented in the shearing direction thereto, rotates in the pulling direction, and the retainer follows the direction in which the air bag cover is pushed open. That is, the load in the shearing direction acting on the retainer causes the retainer to rotate, and the load in the shearing direction is converted to a load oriented in the pulling direction. Accordingly, since only a load oriented in the pulling direction is applied to the retainer, energy at the time of the inflation of the air bag is used effectively to break the retainer, with the result that the air bag cover is pushed open smoothly.

The above and other objects, features and advantages of the present invention will become more apparent from the following detailed description of the invention when read in conjunction with the accompanying drawings.

DESCRIPTION OF THE PREFERRED EMBODIMENT

A description will be given of a specific embodiment of the present invention. Those component parts and portions that are identical with those of the conventional art shown in FIGS. 6 to 8 will be denoted by the same reference numerals.

Figure 1:
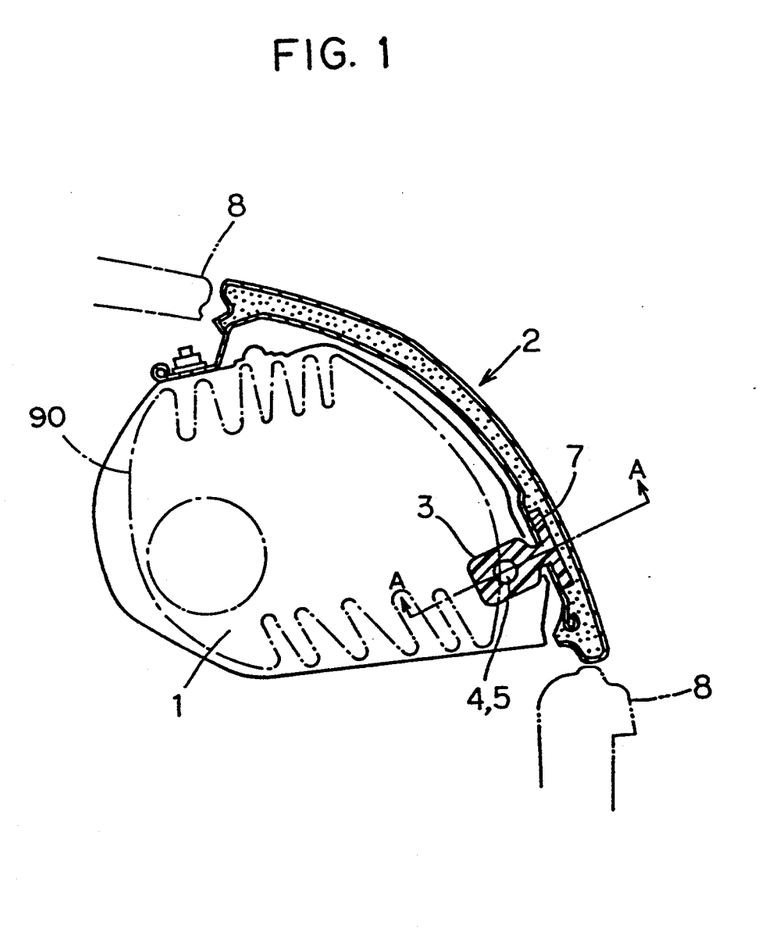
FIG. 1 is a side cross-sectional view of an air bag cover opening mechanism in accordance with the present invention.
Figure 2:
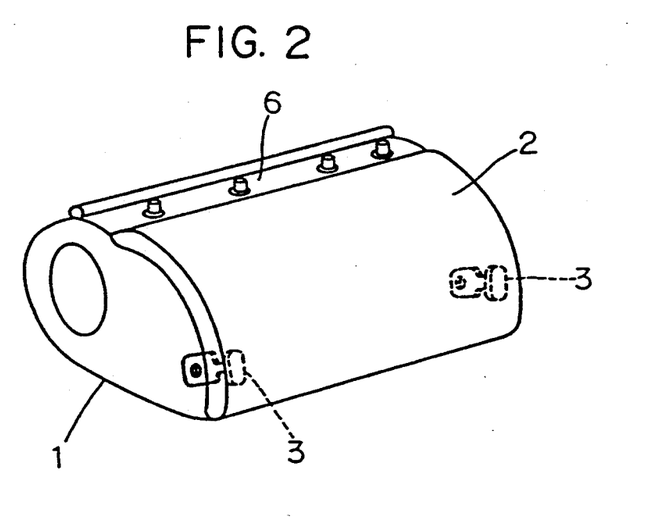
FIG. 2 is an overall perspective view of an air bag cover opening mechanism in accordance with the present invention.

FIGS. 1 to 5 illustrate a preferred embodiment of the present invention. In FIGS. 1 and 2, an air bag 90 in a folded state is accommodated in an air bag case 1. An air bag cover 2 covers an opening which is provided in the air bag case 1 and through which the air bag 90 is adapted to jump out. One end of the air bag cover 2 is rotatably secured to the air bag case 1 via a hinge 6. The other end of the air bag cover 2 is secured to the air bag case 1 via two retainers 3 formed of a resin.

Figure 3:
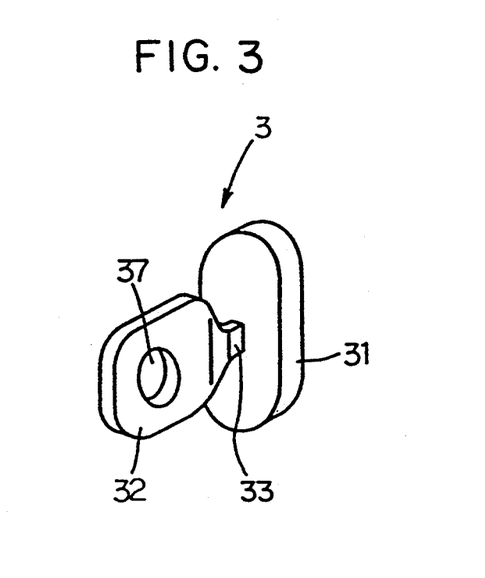
FIG. 3 is an enlarged perspective view of a retainer.

As shown in FIG. 3, the retainer 3 is arranged such that one retaining portion 31 to be secured to the air bag cover 2 and the other retaining portion 32 to be secured to the air bag case 1 are connected to each other via a breaking portion 33, a hole 37 being provided in the other retaining portion 32.

Figure 4:
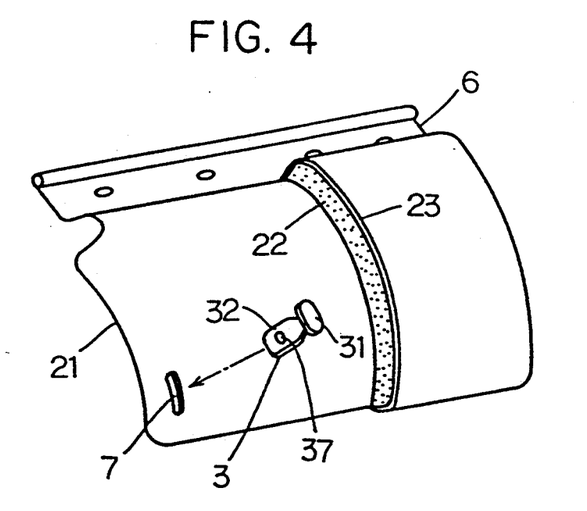
FIG. 4 is a partly cutaway perspective view illustrating how the retainer is attached to the air bag cover.

As shown in FIG. 4, the retainer 3 is set in advance in an insert 21 in such a manner that the other retaining portion 32 is inserted into a slit 7 provided in the insert 21 of the air bag cover 2, thereby allowing one retaining portion 31 to be exposed on the interior surface of the insert 21 and the other retaining portion 32 to project from the exterior surface of the insert 21. Then, a foamed layer 22 and a surface layer 23 are formed integrally on the exterior surface of the insert 21, so that the retainer 3 is secured to the air bag cover 2.

Figure 5:
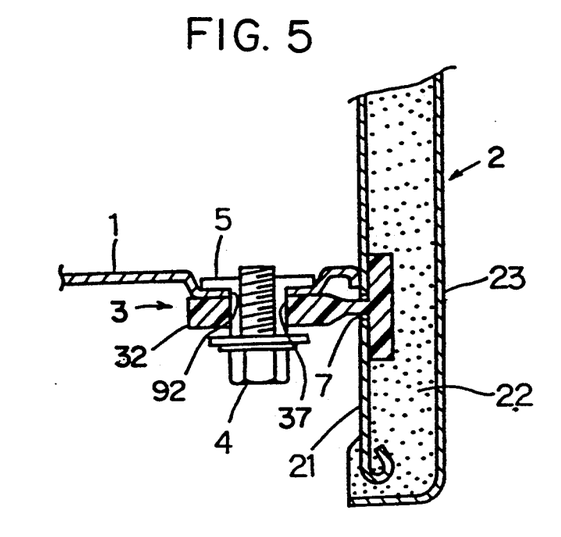
FIG. 5 is a cross-sectional view taken along A—A in FIG. 1.

A description will now be given of a structure for fixing the air bag cover 2 to air bag case. An upper end of the air bag cover 2 is fixed to the air bag case 1 by hinge 6 formed integrally with the insert 21. Hinge 6 is attached to the air bag case 1 by bolts or the like (see FIGS. 1 and 2). As shown in FIG. 5, a lower end of the air bag cover 2 is fixed to the air bag case 1 as follows. A hole 92 provided in a side wall of the air bag case 1 is aligned with the hole 37 in the retaining portion 32 projecting from the reverse surface of the air bag cover 2. A spacer 5 with a head is inserted from the inner side of the air bag case 1 into the aligned holes 92, 37. Then, a bolt 4 is threaded into an internally threaded hole provided in the spacer 5 so as to secure the other retaining portion 32 with respect to the air bag case 1 via the spacer 5. Since the other retaining portion 32 is secured with respect to the air bag case 1 via the spacer 5, the other retaining portion 32 is rotatable around spacer 5 with respect to the air bag case 1. It should be noted that the spacer 5 having the internally threaded hole also serves as a nut.

With the air bag device having the air bag cover opening mechanism arranged as described above. The inflation of the air bag 90 causes a load to act on the interior surface of the air bag cover 2 and forces the air bag cover toward the interior of the vehicle. Specifically, the load causes the air bag cover 2 to open with the hinge 6 as a center of rotation at the upper end thereof and to advance into the interior of the vehicle compartment. At this time, a load oriented in a shearing direction and a load oriented in a pulling direction act on the retainer 3. However, since the retainer 3 is rotatably secured to the side surface of the air bag case 1, the retainer 3 rotates upward due to the load acting in the shearing direction. Accordingly, only the load oriented in the pulling direction acts on the retainer 3. Since the load at the time of the inflation of the air bag effectively acts on the retainer 3, the breaking portion 33 provided in the retainer 3 is broken smoothly, with the result that the air bag cover 2 is opened smoothly.

Furthermore, in this embodiment arranged as described above, before the air bag device is installed in an instrument panel 8, the air bag cover 2 is attached in advance to the air bag case 1 in which an inflator (unillustrated), the air bag, etc., are accommodated, and the air bag device is attached to the instrument panel 8 after the air bag cover 2 and the air bag case 1 are formed into an assembly. Accordingly, the difficult operation of attaching the air bag cover 2 from the reverse side of the instrument panel is eliminated, so that the operational efficiency in assembling the air bag device to the instrument panel can be improved.

It should be noted that in the present invention the location where the air bag cover 2 is attached is not restricted to the air bag case 1, and the air bag cover 2 may be attached to the instrument panel 8 which is a base on which the air bag device body is attached. In addition, the material of the retainer 3 is not restricted to a resin, any other suitable material may be employed.

In accordance with the present invention, since the load acting at the time of the inflation of the air bag functions effectively to break the retainer, the pushing open of the air bag cover is effected smoothly.

In addition, since the retainers of the air bag cover are supported rotatably with respect to the air bag case, even when the air bag cover and the air bag case move relative to each other due to vibrations or the like occurring in the vehicle, that movement is absorbed by the rotation of the retainers. Therefore, an undue load is prevented from being applied to the retainer, and the breaking portion is hence prevented from undergoing fatigue.

Furthermore, the conventional art each retainer is tightened directly by a securing means such as a bolt, and an external force such as a torsion can occur in the breaking portion due to the tightening torque at the time of tightening. In contrast, in the present invention, because the retainers are rotatably secured to the air bag case or the base, such external forces are not applied to the retainer. Additionally, since the structure adopted is such that the retainers are rotatably held, the torque acting due to the tightening of the bolt is received not by the retainer but by the spacer. Therefore, there is still another advantage in that the vibrations of the air bag cover are not imparted to the bolt, so that the loosening of the bolt is prevented.

What is claimed is:

1. An air bag cover opening mechanism for an air bag device for use in a vehicle, comprising:
   an air bag secured to a vehicle body and adapted to accommodate an air bag in a folded state, said air bag case being provided with an opening;
   an air bag cover for closing the opening of said air bag case;
   a connecting member for pivotally connecting one end of said air bag cover to said air bag case about which said air bag cover pivots when opened; and
   connecting means for connecting another end of said air bag cover to said air bag case in such a manner that only a tensile load acting in a direction of a path of opening of said air bag cover acts on said connecting means,
   said connecting means comprises:
      a retainer having an end secured to said air bag cover; and
      attachment members by which a second end of said retainer is secured to said air bag case,
      said attachment members comprise:
         a spacer which is inserted into said retainer; and
         a bolt for rotatably securing said retainer to said air bag case via said spacer such that said retainer can rotate about an axis of said spacer so that only a tensile load in the direction of opening of the air bag cover is applied to the retainer when the air bag cover opens.

2. An air bag cover opening mechanism according to claim 1, wherein said retainer has at an intermediate portion thereof a breaking portion whose tensile strength at rupture is smaller than that at opposite end portions thereof.

3. An air bag cover opening mechanism according to claim 2, wherein said retainer is formed of a resin.

4. An air bag cover opening mechanism according to claim 1, wherein said air bag cover has an inserting portion for retaining an end portion of said retainer therein, and the end portion of said retainer is retained as said retainer is inserted into said inserting portion.

5. An air bag cover opening mechanism according to claim 4, wherein said inserting portion comprises a slit for retaining the end portion of said retainer therein.

6. An air bag cover opening mechanism according to claim 4, wherein said air bag cover comprises an inner surface layer, a foamed layer, and an outer surface layer, said inserting portion being provided in said inner surface layer.

7. An air bag cover opening mechanism according to claim 6, wherein said foamed layer of said air bag cover in cooperation with said insert tucks in the end portion of said retainer so that the end portion of said retainer will not come off said air bag cover owing to a tensile load.

8. An air bag cover opening mechanism according to claim 1, wherein said air bag case has a retainer holding portion for securing said connecting means to a side surface thereof.

9. An air bag cover opening mechanism for an air bag device for use in a vehicle, comprising:
   an air bag case secured to a vehicle body and adapted to accommodate an air bag in a folded state, said air bag case being provided with an opening;
   an air bag cover for closing the opening of said air bag case;
   a connecting member for pivotally connecting one end of said air bag cover to said air bag case about which said air bag cover pivots when opened; and
   connecting means having a retainer and attachment members, said retainer having one end secured to said air bag cover and another end secured rotatably to said air bag case by means of said attachment members, said attachment members comprise a spacer which is inserted into said retainer and bolt for rotatably securing said retainer to said air bag case via said spacer such that only a tensile load acting in the direction of opening of said air bag cover retainer.

10. An air bag cover opening mechanism according to claim 9, wherein said retainer has at an intermediate portion thereof a breaking portion whose tensile strength at rupture is smaller than that at opposite end portions thereof.

11. An air bag cover opening mechanism according to claim 10, wherein said retainer is formed of a resin.

12. An air bag cover opening mechanism according to claim 9, wherein said air bag cover has a slit for retaining an end portion of said retainer therein, and the end portion of said retainer is retained as said retainer is inserted into said slit.

13. An air bag cover opening mechanism according to claim 12, wherein said air bag cover comprises an inner surface layer, a foamed layer, and an outer surface layer, said slit being provided in said inner surface layer, and said foamed layer of said air bag cover in cooperation with said insert being adapted to tuck in the end portion of said retainer so that the end portion of said retainer will not come off said air bag cover owing to a tensile load.

14. An air bag cover opening mechanism according to claim 9, wherein said air bag case has a retainer holding portion for securing said connecting means to a side surface thereof.

15. An air bag cover opening mechanism for an air bag device for use in a vehicle, comprising:
   an air bag case secured to a vehicle body and adapted to accommodate an air bag in a folded state, said air bag case being provided with an opening;
   an air bag cover for closing the opening of said air bag case;
   a connecting member for pivotally connecting one end of said air bag cover to said air bag case; and
   connecting means having a retainer, a spacer inserted into said retainer, and a bolt for rotatably securing said retainer to said air bag case via said spacer such that said retainer may rotate about an axis of said spacer such that only a tensile load acting in the direction of opening of said air bag cover is applied to said retainer, said retainer being formed of a resin and having a first end secured to said air bag cover and a second end secured rotatably to said air bag case by means of said spacer and said bolt, said retainer having at an intermediate portion thereof a breaking portion whose tensile strength at rupture is smaller than that at opposite end portions thereof.

16. An air bag cover opening mechanism according to claim 15, wherein said air bag cover comprises an inner surface layer, a foamed layer, and an outer surface layer, a slit being provided in said inner surface layer such that only said second end of said retainer is insertable into said slit, said slit being adapted to retain the first portion of said retainer as said retainer is inserted into said slit, and said foamed layer of said air bag cover in cooperation with said insert being adapted to tuck in the end portion of said retainer so that the end portion of said retainer will not come off said air bag cover owing to a tensile load.

17. An air bag cover opening mechanism according to claim 15, wherein said air bag case has a retainer holding portion for securing said connecting means to a side surface thereof.

18. An air bag cover opening mechanism according to claim 15, wherein said spacer is inserted into said retainer and said air bag case, and a gap is formed between a lower end of a head of said bolt and said air bag case when said spacer is tightened by said bolt.

* * * * *